Figure 1:
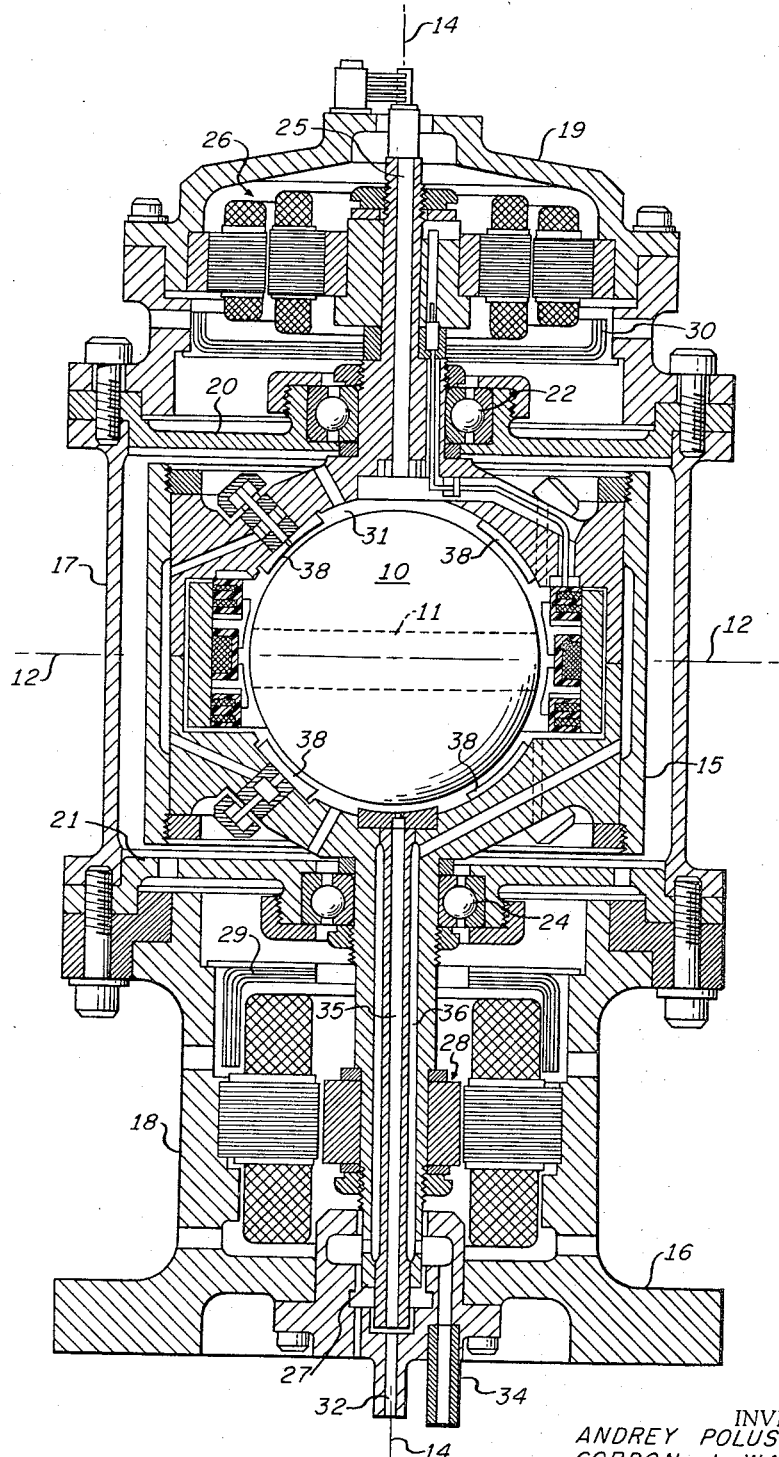

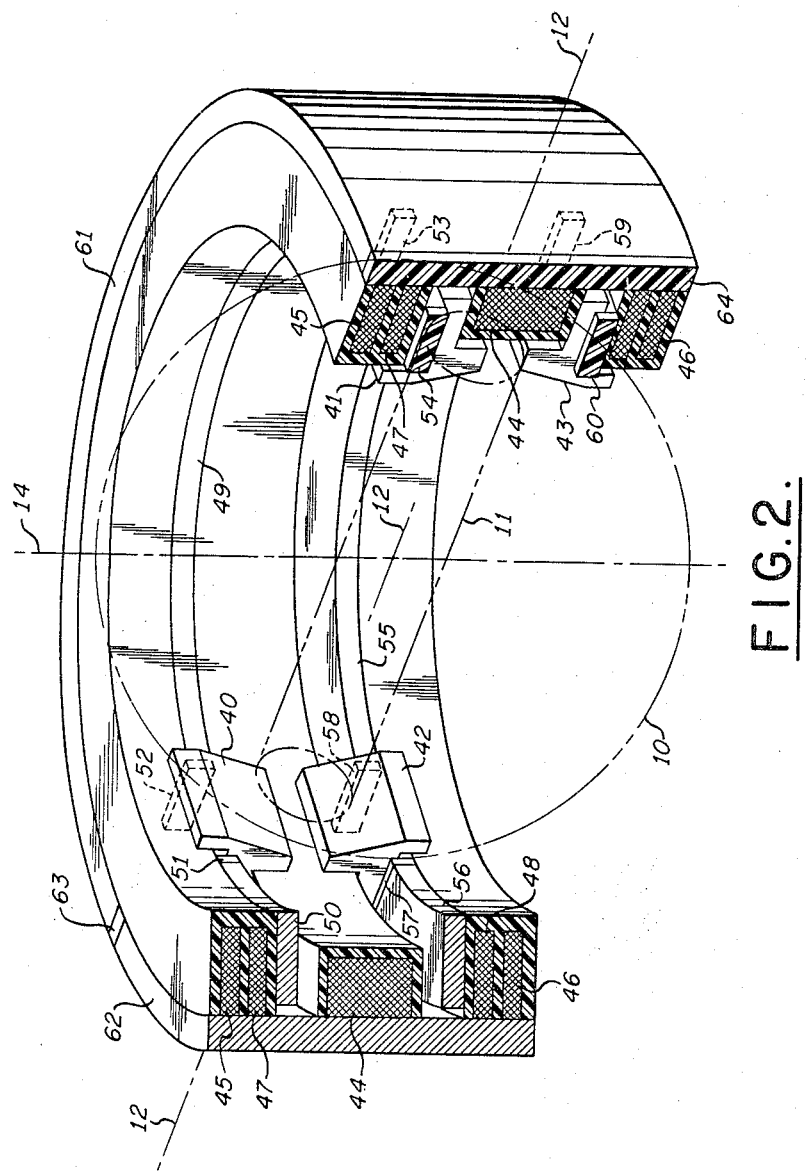

United States Patent Office 3,347,105
Patented Oct. 17, 1967

3,347,105
GYROSCOPIC APPARATUS
Andrey Polushkin, Flushing, N.Y., and Gordon J. Watt, Montreal, Quebec, Canada, assignors to Sperry Rand Corporation, Great Neck, N.Y., a corporation of Delaware
Filed Mar. 5, 1965, Ser. No. 437,603
10 Claims. (Cl. 74—5.6)

This invention relates to an improvement in apparatus of the type including a rotating rotor case and a mechanically free gyroscopic rotor such as shown in copending application Ser. No. 232,713, now Patent No. 3,252,340 filed Oct. 24, 1962, by Gordon J. Watt, one of the present inventors.

More particularly, the present invention relates to gyroscopic apparatus in which a mechanically free rotor with an axial magnetic flux source is coupled magnetically in synchronized and oriented relation with a case that is mounted on a frame for rotation about an axis. In the apparatus described in the noted application, the magnetic flux guiding structure of the case includes three rings concentric to the case rotation axis and respective pairs of pole pieces connected to one of the rings in angularly as well as axially spaced relation to the axis. The case structure further includes pick-off means with a coil concentric to the rotation axis located between the axially spaced pairs of pole pieces, torque exerting means with axially spaced coils concentric to the rotation axis and arranged on the respective sides of the coil of the pick-off means, and torque compensating means with axially spaced coils concentric to the rotation axis between the respective torquing coils and pick-off coil. A second ring of the case structure inhibits coupling between one of the coils of the torquing means and the pick-off coil. The third ring performs a like function in decoupling the other of the coils of the torquing means from the pick-off coil.

An object of the present invention is to increase the accuracy of the orientation between the rotor and case of the improved apparatus.

A further object is to decrease the physical size required of the case structure by reducing the coupling provided between the coils of the pick-off means and torque exerting means.

A still further object of the present invention is to eliminate high energy losses occurring because of the alternating current excitation in the magnetic flux guiding rings of the case structure.

One of the features of the invention resides in the provision of a member in the case structure with parts arranged in encircling relation to the case axis having a first high permeable magnetic flux guiding segment between pairs of pole pieces and a corresponding second high permeable magnetic flux guiding segment electrically insulated from the first segment between the pairs of pole pieces.

Another feature of the invention resides in the inclusion in the case structure of four additional high permeable segments that are electrically insulated from the included pairs of pole pieces in a location between the coils of torque exerting means and pick-off means to decrease the coupling between the coils.

Further objects, features and structural details of the present invention will be apparent from the following description when read in relation to the accompanying drawing, wherein:

FIG. 1 is an elevation view in section of the improved gyroscopic apparatus; and FIG. 2 is an enlarged perspective view partly in section of the portion of the case structure including the flux guiding segments as well as the coils of the pick-off, the torque exerting means, and the compensating torquing means.

As shown in the drawing, the gyroscopic rotor of the improved apparatus is indicated at 10 as a spherical element with a cylindrical permanent magnet 11 located in a diametral opening therein having a magnetic axis 12. The rotor 10 spins with the axis 12 rotating in a plane that is normally perpendicular to the rotation axis 14 of a rotor case 15, FIG. 1. The element that is fixed to the craft on which the apparatus is used is provided by a frame 16 with a part 17 for housing the case 15. Frame 16 further includes a motor housing 18, a generator housing 19 and axially spaced mounting plates 20 and 21 for bearings 22 and 24 that support the case 15 for rotation about the axis 14. As shown in FIG. 1, case 15 includes a shaft 25 for bearing 22 that extends to the generator housing 19 having the rotor of generator 26 fixed thereto. Shaft 27 for bearing 24 extends from the other end of the case 15 and includes thereon the rotor of an electric motor 28 which provides means in the improved apparatus for rotating the case about axis 14 at a constant speed. The frame further includes shielding 29 for separating the field of the motor 28 from the field of the magnet 11. Shielding 30 is also provided for separating the field of the generator from the field of the magnet 11.

In the apparatus shown in FIG. 1, the rotor case 15 is an hermetically sealed element with a cavity 31 conforming to the configuration of the rotor 10. Air for supporting the rotor is conducted through conduits 32, 34 in the frame 16 and connecting conduits 35, 36 in the shaft 27 to the interior of the cavity 31. A plurality of support pads 38 are uniformly distributed within the cavity 31 of conforming geometrical shape with a common center on the axis 14. In operation, the center of the rotor 10 is coincident with the common center of the pads 38. Each pad has a central opening through which air is exhausted to provide a plurality of pressure points between the case 15 and rotor 10. The pressure points act like linear springs to support the rotor in stable equilibrium within the case. In the described structure, the motor 28 drives the case 15 about axis 14 at a fixed speed. This determines the speed at which the rotor 10 of the apparatus spins.

As shown in FIG. 2, the assembly for coupling the rotor 10 to the case 15 includes a first pair of opposed pole pieces 40, 41 located in 180 degree angular spaced relation about the case axis 14 in normally equidistant axially spaced relation to one side of the axis 12 of the flux field of the magnet 11 of rotor 10. The case structure also includes a second pair of opposed pole pieces 42, 43 located in a corresponding angular relation about the axis 14 and located in normally equidistant, axially spaced relation along the axis 14 to the other side of the axis 12 of the flux field of the rotor. The extent of relative angular tilt or displacement between the plane of rotation including flux axis 12 of the rotor 10 from a normal perpendicular relation with spin axis 14 of the case 15 is detected by a pick-off with an electrical output that includes the rotating magnet 11 and a winding 44 with coils concentric to the case axis 14 located between the axially spaced pairs of pole pieces 40, 41 and 42, 43. The pick-off is effectively a self-excited permanent magnet generator that provides a null output when axis 12 of the rotor spins in a plane perpendicular to the case axis 14.

The assembly further includes a means for exerting a torque on the gyroscopic rotor to restore the case and rotor element to normal tilt free relation as shown in FIG. 2. The provided torquing means includes a pair of windings 45, 46 with coils concentric to the case axis 14 on case element 15 that are equidistantly spaced along the axis on the respective sides of the pick-off winding 44. The torquing windings 45, 46 produce a field that couples with the field of the magnet 11 to obtain the desired result as described in the heretofore noted copending application. In accordance with the present invention, coupling between the fields of the pick-off winding and torque exerting windings is inhibited by respective pairs of high permeable segments that are electrically insulated from the pole pieces 40, 41, 42 and 43 and by torque compensating means having windings 47, 48 with coils concentric to the axis 14 one of which is between the coil of torque winding 45 and pick-off winding 44 and the other of which is between the coil of the torque winding 46 and the pick-off winding 44.

One of the described pairs of high permeable segments indicated at 49 and 50 provides a part of the case structure that encircles the case axis 14 in a location between the coils of the compensating means winding 47 and the pick-off winding 44 that is electrically spaced from pole pieces 40 and 41 by shims 51, 52, 53 and 54 of a material of high electrical resistance. The other of the described pairs of segments indicated at 55 and 56 provide a further part of the case structure that encircles the case axis 14 in a location between the coils of the compensating means winding 48 and the pick-off winding 44 that is isolated from pole pieces 42 and 43 by shims 57, 58, 59 and 60 of a material of the same electrical resistance as the shims 51 to 54.

In the improved apparatus, the case structure further includes a member with parts arranged in encircling relation to the axis 14 having a magnetic flux guiding segment 61 between the pairs of pole pieces 40–41 and 42–43, and a corresponding magnetic flux guiding segment 62 between the pairs of pole pieces 40–41 and 42–43 that is spaced from the segment 61 by shims 63, 64 of a material of high electrical resistance. The shims 63, 64 located between the adjacent ends of the segments 61, 62 divide the field of the magnet 11 in unequal portions between the segments and respective pole pieces when the axis of the magnet 11 is not aligned with the shims in angularly oriented relation to the spinning rotor case 15. From standstill, as the case 15 accelerates to operating speed by the motor 28, the rotor 10 is directed with relation to the case 15 by the attraction of the polar ends of the magnet 11 to the respective pole pieces 40, 42 and 41, 43. As the speeds of the case and rotor synchronize the parts orient with equal division of the flux of the magnet 11 in the respective segments 61, 62 and the magnetic axis 12 of the magnet in alignment with the shims 63, 64. In operation, the paired pole pieces and segments normally provide two paths of equal magnetic reluctance on the respective sides of the flux field axis 12 that couple the gyroscopic rotor to the case with the axial flux field rotating in a plane perpendicular to the axis 14 in synchronized and oriented relation with the case 15.

In the improved apparatus, coupling between the torque winding 45 and the pick-off winding 44 is decreased because the high permeable pair of segments 49 and 50 prevents part of the magnetic flux of the torque winding 45 from crossing the pick-off winding 44 by offering a low reluctance path. This reduces their flux linkage and therefore the coupling between them. Similarly, coupling between the torque winding 46 and the pick-off winding 44 is decreased because the other pair of high permeable segments 55 and 56 prevents some of magnetic flux of the torque winding 45 from crossing the pick-off winding 44. Because of the described case structure, less decoupling is required of compensating torque windings 47, 48 with a resulting reduction in the size of the wound portion of the case.

In the improved apparatus the high energy loss occurring because of alternating current excitation in the flux guiding structure concentric to the case axis 14 and formed by the segments 49, 50 together with the respective pole pieces 40, 41 is eliminated by the high resistance shims 51, 52 and 53, 54. Similar loss in the structure formed by the segments 55, 56 together with the respective pole pieces 42, 43 is eliminated by the high resistance shims 57, 58 and 59, 60. Similar loss in the structure formed by the segments 61, 62 is eliminated by high resistance shims 63, 64.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Gyroscopic apparatus including a frame, a rotor case rotatably mounted on the frame, means for rotating the case about an axis at a constant speed, a gyroscopic rotor supported in the case having an axial magnetic flux field, an assembly for coupling the rotor to the case magnetically including a first pair of opposed pole pieces located in 180 degree angular spaced relation about the case axis in normally equidistant axially spaced relation to one side of the axis of the field of the rotor, a second pair of opposed pole pieces located in corresponding angular relation about the case axis and located in equidistant axially spaced relation along the case axis to the other side of the axis of the field of the rotor, and a member with parts arranged in encircling relation to the case axis having a first magnetic flux guiding segment between the pairs of pole pieces, and a corresponding second magnetic flux guiding segment between the pairs of pole pieces, the paired pole pieces and segments normally providing two paths of equal magnetic reluctance on the respective sides of the flux field axis that couple the gyroscopic rotor to the case with the axial flux field rotating in a plane perpendicular to the case axis in synchronized and oriented relation with the case.

2. A combination of the character claimed in claim 1, in which the segments of the encircling member of the case assembly are spaced from one another electrically by shims of high resistance located between the respective adjacent ends of the segments.

3. A combination of the character claimed in claim 2, including a pick-off having an electrical output depending on the angular displacement of the plane of the rotating axial flux field and the case axis from a perpendicular relation, and in which the shimmed encircling member of the case assembly includes a pick-off winding concentric to the case axis between the axially spaced pairs of pole pieces.

4. A combination of the character claimed in claim 3, including means for exerting a torque on the gyroscopic rotor, and in which the shimmed encircling member of the case assembly includes a pair of torquing windings with coils concentric to the case axis equidistantly spaced along the axis of the respective sides of the pick-off winding.

5. A combination of the character claimed in claim 4, in which the shimmed encircling member of the case assembly includes two high permeable segments concentric to the case axis between the pick-off winding and one of the torque windings, shims of high electrical resistance between the ends of each of the segments and their respective pole pieces, two further high permeable segments concentric to the case axis between the pick-off winding and the other of the torque windings, and shims of high electric resistance between the ends of each of the further segments and their respective pole pieces.

6. A combination of the character claimed in claim 5, in which the shimmed encircling member includes a first torque compensating winding concentric to the case axis between one of the torque coils and the segments between the pick-off winding and the related torque winding, and a second torque compensating winding concentric to the case axis between the other of the torque coils and the segments between the pick-off winding and the related torque winding.

7. In a gyroscopic combination, a frame, a rotor case rotatably mounted on the frame, a gyroscopic rotor within said case means for rotating the case about an axis at a constant speed, an assembly for coupling the rotor to the case magnetically including a first pair of opposed pole pieces located in 180 degree angular spaced relation about the axis, a second pair of opposed pole pieces located in corresponding angular relation about the axis and spaced in equidistant relation to the first pair of pole pieces along the axis, and a member arranged in encircling relation to the axis having a first magnetic flux-guiding segment between the pair of pole pieces, and a corresponding second magnetic flux-guiding segment spaced from the first segment between the pairs of pole pieces.

8. A combination of the character claimed in claim 7, including a pick-off and in which the segmented encircling member of the case assembly includes a pick-off winding fixed to the segments concentric to the axis between the axially spaced pairs of pole pieces.

9. A combination of the character claimed in claim 8, including torque exerting means, and in which the segmented encircling member of the case assembly includes a pair of torque windings concentric to the axis equidistantly spaced along the axis on the respective sides of the pick-off winding, third and fourth flux guiding segments concentric to the axis and separated from one of the pair of pole pieces between the pick-off winding and one of the torque windings, and fifth and sixth flux guiding segments concentric to the axis and separated from the other of the pair of pole pieces between the pick-off winding and the other of the torque windings.

10. A combination of the character claimed in claim 9, in which the segmented encircling member includes a first torque compensating winding concentric to the axis between one of the torque windings and the third and fourth segments, and a second torque compensating winding concentric to the axis between the other of the torque windings and the fifth and sixth segments.

References Cited
UNITED STATES PATENTS

| | | | |
|---|---|---|---|
| 2,850,905 | 9/1958 | Sedgfield | 74—5.7 |
| 3,125,886 | 5/1965 | Frye | 74—5.7 |
| 3,260,122 | 7/1966 | Rocks | 74—5.4 |

FRED C. MATTERN, Jr., *Primary Examiner.*

J. D. PUFFER, C. J. HUSAR, *Assistant Examiners.*